US011370491B2

(12) United States Patent
Cadbury-Allen

(10) Patent No.: US 11,370,491 B2
(45) Date of Patent: Jun. 28, 2022

(54) CHASSIS SYSTEM

(71) Applicant: Caterpillar SARL, Geneva (CH)

(72) Inventor: Joel Kenneth Cadbury-Allen, Hartlepool (GB)

(73) Assignee: Caterpillar SARL, Geneva (CH)

( * ) Notice: Subject to any disclaimer, the term of this patent is extended or adjusted under 35 U.S.C. 154(b) by 0 days.

(21) Appl. No.: 16/819,729

(22) Filed: Mar. 16, 2020

(65) Prior Publication Data

US 2020/0324819 A1 Oct. 15, 2020

(30) Foreign Application Priority Data

Apr. 9, 2019 (GB) ...................... 1905029

(51) Int. Cl.
*B62D 21/11* (2006.01)
*B62D 21/20* (2006.01)
*B60B 35/02* (2006.01)
*B62D 53/04* (2006.01)
*B62D 63/06* (2006.01)

(52) U.S. Cl.
CPC .............. B62D 21/11 (2013.01); B62D 21/20 (2013.01); B60B 35/02 (2013.01); B62D 53/04 (2013.01); B62D 63/06 (2013.01)

(58) Field of Classification Search
CPC ........ B62D 21/11; B62D 21/20; B62D 53/04; B62D 63/06; B60B 35/02; B60G 2206/602; B60G 2204/4302; B60G 5/00; B60G 9/003; B60G 7/02
See application file for complete search history.

(56) References Cited

U.S. PATENT DOCUMENTS 3,388,923 A 6/1968 Wade
4,415,179 A * 11/1983 Marinelli ............... B60G 9/003
                                                                            280/683
5,280,957 A * 1/1994 Hentschel ............... B60G 3/20
                                                                            280/124.109

(Continued)

FOREIGN PATENT DOCUMENTS

CN        206914434 U      1/2018
DE     102006045864 A1     4/2008

(Continued)

OTHER PUBLICATIONS

Search Report for related United Kingdom Application No. 1905029.3 report dated Sep. 18, 2019.

*Primary Examiner* — Darlene P Condra

(57) ABSTRACT

This disclosure is directed towards a chassis system and more particularly to a spindle cross member for the chassis system which is suitable for an articulated vehicle. At least one of the cross members of the chassis system is spindle cross member comprising a main member, having a middle section and tubular end sections. The middle section has an at least partially curved middle section wall which defines a cavity with an opening for receiving a head of a suspension frame of the chassis system. The tubular end sections are located at each end of the middle section located along a longitudinal axis of the spindle cross member. The spindle cross member further comprises means for pivotally attaching the head of the suspension frame to the middle section wall within the cavity.

12 Claims, 6 Drawing Sheets

(56) References Cited

U.S. PATENT DOCUMENTS

| | | | | |
|---|---|---|---|---|
| 5,366,035 | A * | 11/1994 | Hayashida | B60G 11/113 |
| | | | | 180/378 |
| 5,971,425 | A * | 10/1999 | Dinsley | B60G 5/04 |
| | | | | 280/124.128 |
| 6,470,990 | B1 * | 10/2002 | Panoz | B62D 29/008 |
| | | | | 180/311 |
| 7,866,231 | B2 * | 1/2011 | Kincaid | F16H 57/037 |
| | | | | 74/607 |
| 9,096,240 | B2 | 8/2015 | Rodet et al. | |
| 9,549,046 | B1 | 1/2017 | Tobias et al. | |
| 9,873,455 | B2 * | 1/2018 | Buschjohann | B62D 21/03 |
| 2007/0138755 | A1 * | 6/2007 | Copsey | B60G 13/005 |
| | | | | 280/124.128 |
| 2010/0025953 | A1 * | 2/2010 | Buhl | B60G 9/02 |
| | | | | 280/124.153 |
| 2012/0119464 | A1 | 5/2012 | Moriyama et al. | |
| 2020/0156427 | A1 * | 5/2020 | Schutt | B60G 7/008 |
| 2021/0009206 | A1 * | 1/2021 | Okamoto | B62D 21/11 |

FOREIGN PATENT DOCUMENTS

| | | |
|---|---|---|
| EP | 2982529 A1 | 2/2016 |
| WO | 9904991 W | 2/1999 |

* cited by examiner

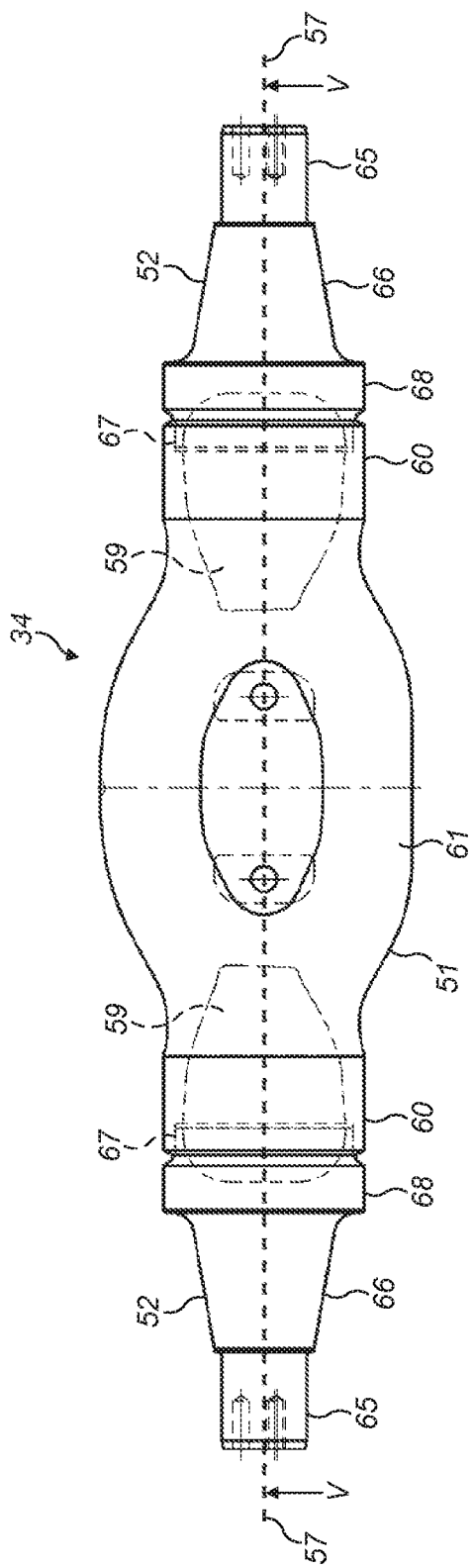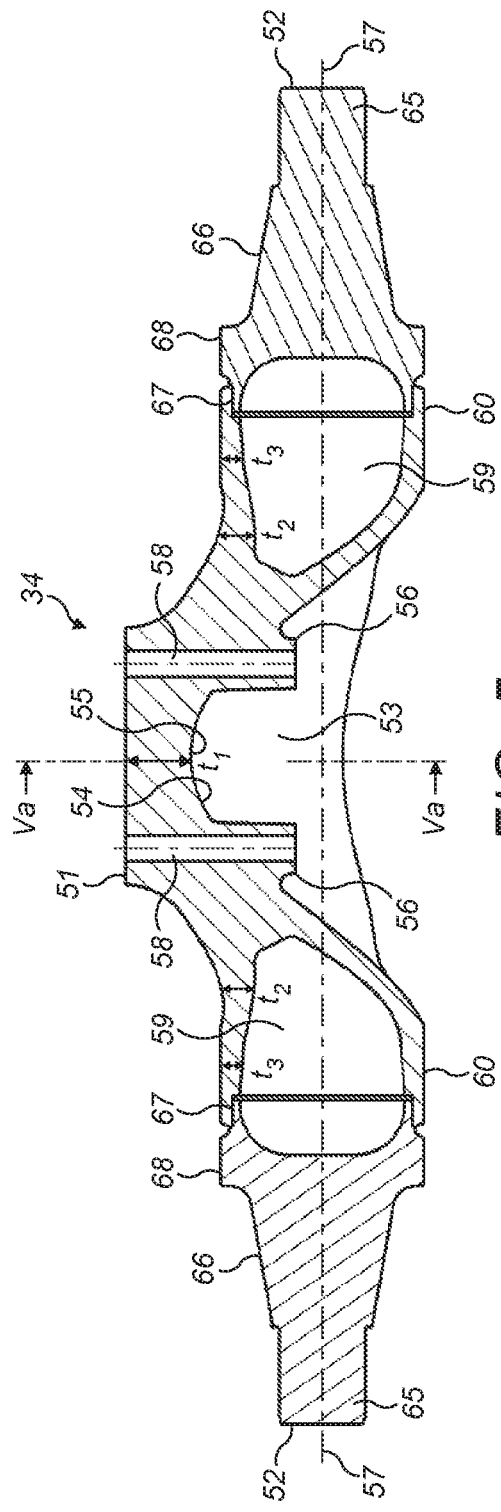
FIG. 4
FIG. 5

CHASSIS SYSTEM

CROSS-REFERENCE TO RELATED APPLICATION

This application claims priority under 35 USC § 119 and the Paris Convention to United Kingdom Patent Application No. 1905029.3 filed on Apr. 9, 2019.

TECHNICAL FIELD

This disclosure is directed towards a chassis system and more particularly to a spindle cross member for the chassis system which is suitable for an articulated vehicle.

BACKGROUND

Many vehicles and work machines, such as articulated trucks, excavators, dozers, loaders and the like, may have a centre of mass which is relatively high above the ground. This may be as a result of loading during operation, for example where a dump body holds a large mass of material. Work machines are often equipped with work tools which can be raised for safety when not in use and when the vehicle is travelling, which also affects the centre of mass of the vehicle. Such work machines are also typically operated on rough and uneven terrain. As a result, there is a risk that the work machine may tip over as it travels over uneven terrain.

This risk is increased for articulated vehicles, in that these typically comprise a tractor (in which the power unit is usually mounted) and a trailer (which may have a container for holding a mass of material or goods for transportation) connected to one another via an oscillating hitch joint. The oscillating hitch joint enables the tractor and trailer to roll and yaw relative to one another. When operated on uneven terrain, one of the tractor and trailer s may become positioned at an unsafe roll and/or yaw angle and may cause the entire machine to turn over. Alternatively, if the articulated vehicle has an open container, such as a bucket or body mounted on the trailer, any materials or goods held in the open container may fall out when one of the tractor and trailer is positioned above certain roll and/or yaw angle thresholds.

The chassis system of such articulated vehicles may be designed to help reduce the likelihood of this from occurring as well as improving the vehicle ride dynamics. The chassis system of an articulated vehicle typically comprises a tandem axle, which provides a greater weight capacity than a single axle. A tandem axle comprises two axles one or both of the central and rear axles may be driven axles. The chassis system of tandem drive axles utilise special suspension arrangements which permits flexibility between the axles, but which are able to withstand hard operating conditions. One such type of suspension is an equalizing beam suspension, which may be of the leaf spring or rubber load cushion type. Equalizing beams link the suspensions of the adjacent axles and use the lever principle to distribute the load across the axles to reduce the effect of uneven terrain. Equalizing beam systems may also help to lower the centre of gravity of the axle load to provide better stability. Equalizing suspension systems may also include a torque rod to restrict lateral movement of the axles and to keep them centred, to further provide greater stability and roll stiffness.

In an articulated vehicle, the chassis frame has to provide the required geometry for the suspension and body layout, whilst also withstanding the loading from these systems. The oscillating hitch joint significantly reduces frame torsion compared to other vehicles. However, the chassis frame does still experience significant beam torsion, due to the effect of the axle loads being applied via the equalizing beams. A primary chassis cross member may therefore be provided, which has the function of stiffening the chassis to resist this loading, in addition to mounting and locating the rear suspension components in the required positions.

SUMMARY

The disclosure provides a spindle cross member for a chassis system for a vehicle comprising:
    a main member, having a middle section and tubular end sections, said middle section having an at least partially curved middle section wall which defines a cavity with an opening for receiving a head of a suspension frame of the chassis system, and said tubular end sections being located at each end of the middle section located along a longitudinal axis of the spindle cross member; and
    means for pivotally attaching the head of the suspension frame to the middle section wall within the cavity.

The disclosure further provides a chassis system comprising a chassis frame and a suspension frame, said chassis frame comprising at least two longitudinal members and a plurality of cross members, at least one of said cross members being the spindle cross member as claimed in any one of the preceding claims and said suspension frame having a suspension frame head, wherein the suspension frame head is attached to the spindle cross member and is at least partially enveloped by the middle section wall.

The disclosure also provides a vehicle comprising a tractor and a trailer connected to the tractor by an articulated joint, said trailer having at least one axle, wherein the at least one axle is attached to the aforementioned chassis system.

BRIEF DESCRIPTION OF THE DRAWINGS

FIG. 4 is a plan view of the spindle cross member of the chassis system of FIG. 2;

FIG. 5 is a cross sectional side elevation of the spindle cross member of FIG. 4 on the line V-V;

DETAILED DESCRIPTION

The present disclosure is generally directed towards a chassis system which may have a spindle cross member as the primary cross member, which is suitable for a vehicle and in particular for an articulated vehicle. Although the following description only describes an articulated vehicle 10, the chassis system may be used in any vehicle.

Figure 1:
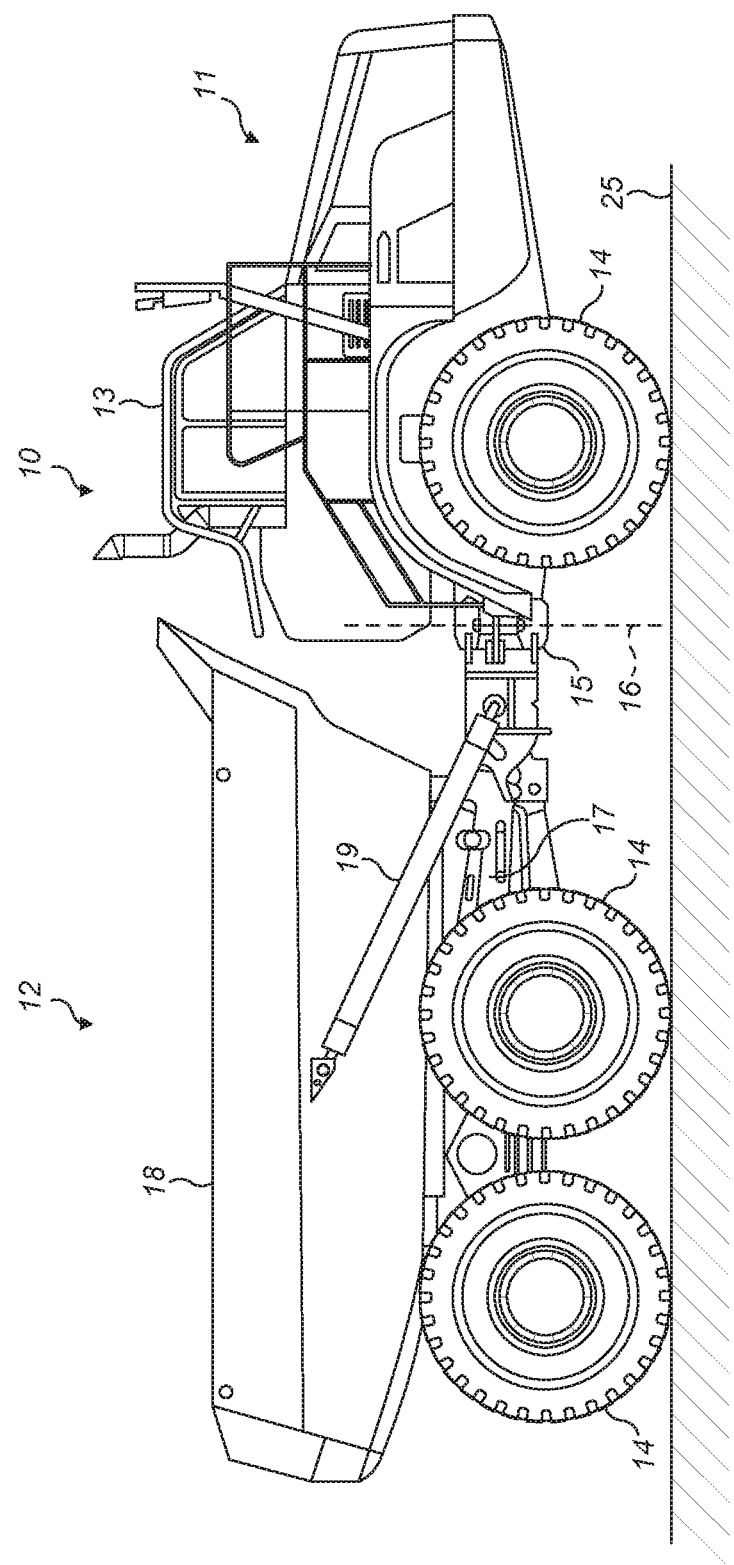
FIG. 1 is a side elevation of an exemplary articulated vehicle comprising the chassis system and spindle cross member of the present disclosure.

FIG. 1 illustrates an exemplary articulated vehicle 10 in which the chassis system of the present disclosure may be used. The articulated vehicle 10 may comprise a tractor 11 and a trailer 12. The tractor 11 may be a tractor unit and may comprise a cab 13 and a power unit (not shown). The power unit may be of any suitable type, such as an internal combustion engine, a micro-turbine or an electric motor. A front axle (not shown) may be provided to support the tractor 11 having one or more ground engaging means 14, such as wheels, mounted at either end of the front axle. The tractor 11 may comprise more than one axle and more than two ground engaging means 14 attached to each axle.

The tractor 11 may be connected to the trailer 12 via a coupling 15, which may be an articulation joint. The coupling 15 may allow the tractor 11 and trailer 12 to be orientated at a different yaw and/or roll angle to each other frame. The yaw angle of the tractor 11 may be different to the yaw angle of the trailer 12 about an articulation axis 16. The articulated vehicle 10 may be steered by adjusting the yaw angle of the tractor 11 and trailer 12 about the articulation axis 16 utilising actuators (not shown), for example hydraulic cylinders, attached to each of the tractor 11 and trailer 12 on either side of the coupling 15.

The trailer 12 may comprise a chassis system 30 and a body 18 adapted to carry a load, such as a dump or ejector body. The chassis system 30 may comprise a chassis frame 17 and the body 18 may be attached to the chassis frame 17 at a pivot point (not shown). A tipping system may be provided to rotate the body 18 about the pivot point. The tipping system may comprise at least one hydraulic actuator 19 connected to the body 18 and the chassis frame 17. The body 18 may comprise an ejector mechanism, having an actuator which may move a plate within the body 18 to eject any material contained therein.

Figure 2:
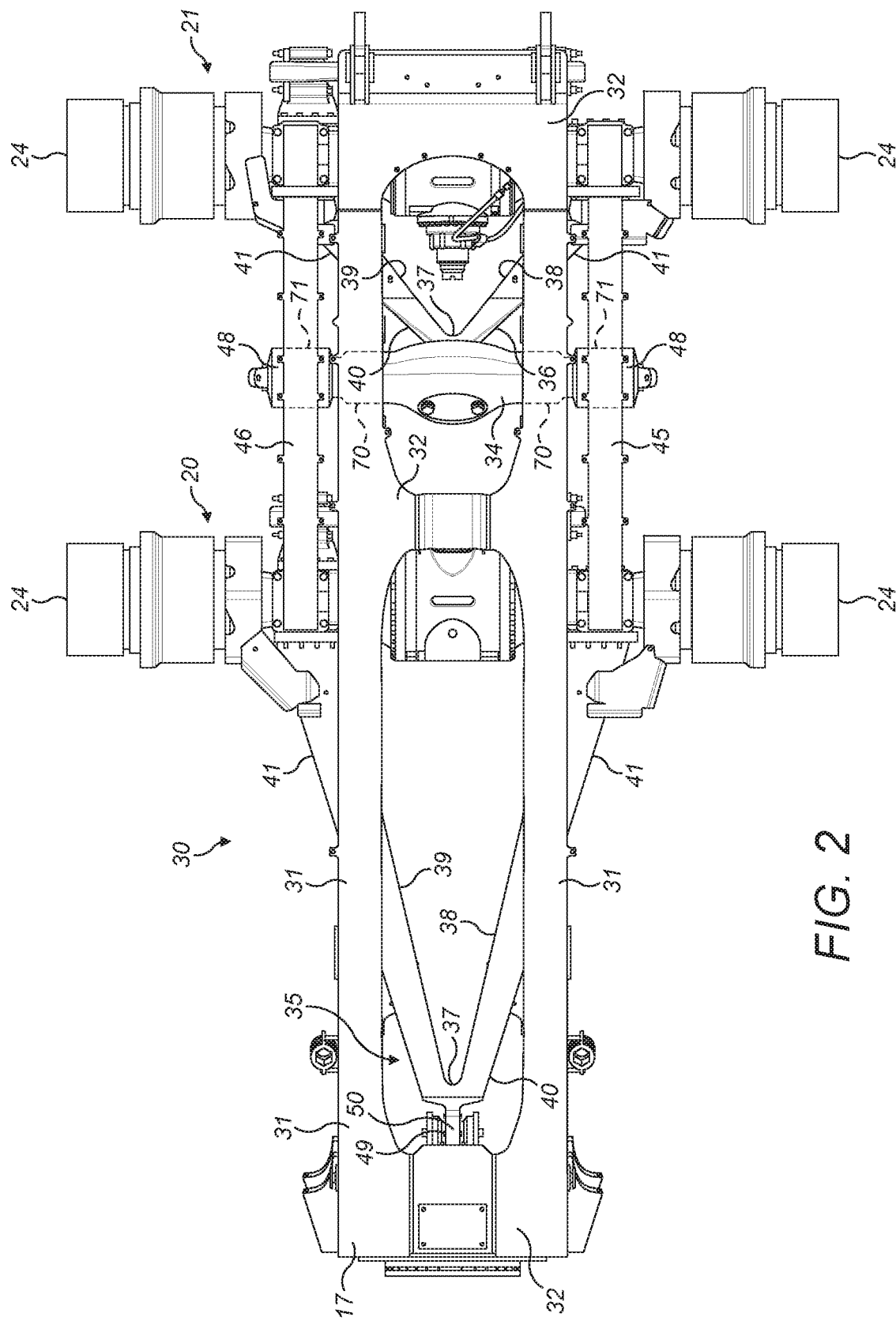
FIG. 2 is a plan view of the chassis system of the trailer of the vehicle of FIG. 1.
Figure 3:
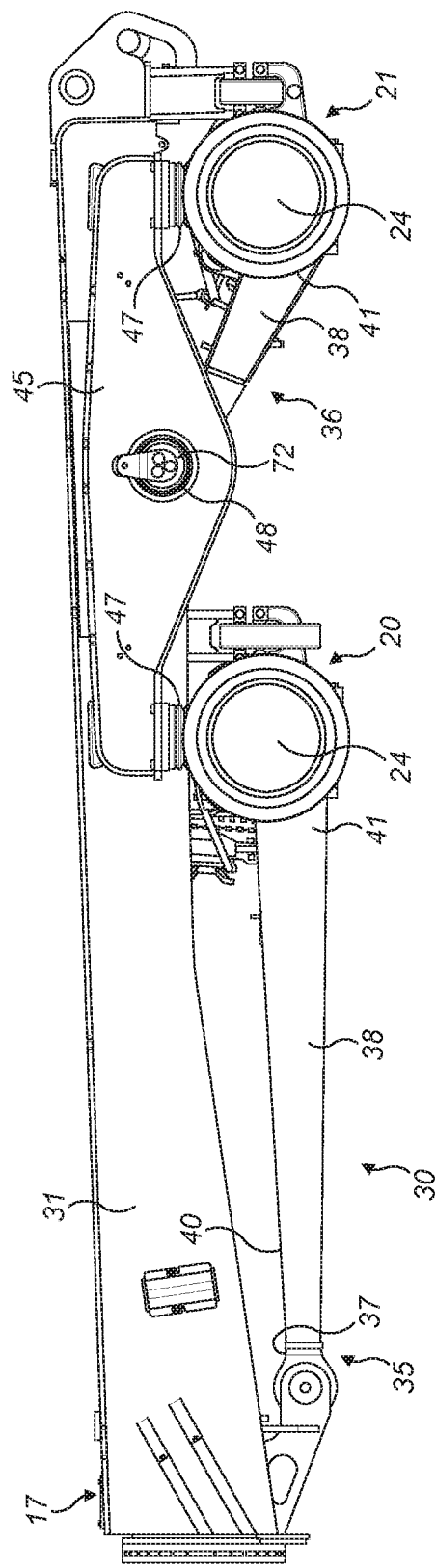
FIG. 3 is a side elevation of part of the chassis system of FIG. 2.

FIGS. 2 and 3 shows the chassis system 30 of the trailer 12. The chassis system 30 may comprise a tandem axle having two axles, namely a central axle 20 and a rear axle 21. The chassis system 30 may, however, have more than two axles, although for the purposes of this embodiment only two axles will be referred to. The ground engaging means 14 (shown in FIG. 1) may be mounted by suitable mounting means 24 located at each end of the central axle 20 and rear axles 21 of the trailer 12. The ground engaging means 14 may provide support between the terrain 25 over which the articulated vehicle 10 travels and the tractor 11 and trailer 12. The ground engaging means 14 may be of any suitable type, for example wheels or tracks, and may be operably connected via the central axle 20 and rear axles 21 to, and thus receive power from, the power unit.

Power may be transferred from the power unit, which may be located in the tractor 11, to one or both of the central axle 20 and rear axles 21 by a drive shaft (not shown) via the coupling 15, depending on whether one or both of the central axle 20 and rear axles 21 are driven axles. An end of the drive shaft may be operably connected to receive power from the coupling 15. Transmission devices (not shown), such as differentials or universal joints, may transfer torque from the drive shaft to the central axle 20 and rear axles 21.

The central axle 20 and rear axles 21 may be attached to the chassis frame 17 by the chassis system 30. The chassis frame 17 may have two parallel longitudinal chassis members 31 and at least two cross members 32 may be attached between the two longitudinal chassis members 31. The chassis frame 17 may also have a spindle cross member 34, which may act as the primary cross member to stiffen the chassis frame 17, and which is attached between the two longitudinal chassis members 31. A central suspension frame 35 may extend between a cross member 32 located at a front of the chassis frame 17 and the central axle 20. A rear suspension frame 36 may extend between the spindle cross member 34 and the rear axle 21. The central suspension frame 35 and rear suspension frame 36 may be configured as A-frames, comprising a suspension frame head 37, a first arm 38 and a second arm 39. Each first arm 38 and second arm 39 may have a first arm end 40 and a second arm end 41. The first arm ends 40 of each first arm 38 and second arm 39 may be joined together at the suspension frame head 37 with the first arm 38 and second arm 39 extending outwardly from the suspension frame head 37 at an angle. The suspension frame heads 37 may be pivotally attached to the respective cross member 32 and spindle cross member 34. The suspension frame head 37 of the central suspension frame 35 may be attached to the cross member 32 by means of a pivot bearing 49 attached to the cross member 32. The pivot bearing 49 may extend through a lug 50 attached to or formed in the suspension frame head 37. The attachment of the rear suspension frame 36 to the spindle cross member 34 will be described below.

The second arm end 41 of the first arm 38 may be attached to the respective central axle 20 or rear axle 21 on one side of the chassis frame 17 and the second arm end 41 of the second arm 39 is attached the same central axle 20 or rear axle 21 on the other side of the chassis frame 17.

As shown in FIGS. 2 and 3, a first equalizer beam 45 may be connected to, and extend between, the central axle 20 and rear axles 21 on one side of the chassis frame 17. A second equalizer beam 46 may be attached to, and extend, between the central axle 20 and rear axles 21 on the other side of the chassis frame 17. The first equalizer beam 45 and second equalizer beam 46 may be attached to the central axle 20 and rear axles 21 via resilient suspension mounts 47. The suspension mounts 47 may comprise a pad of elastomeric material, such as rubber, sandwiched between two mounting plates.

As shown in FIGS. 4 and 5, the spindle cross member 34 may comprise a main member 51 and a spindle end 52 located at either end of the main member 51. The main member 51 may be steel and formed by a casting process. The spindle ends 52 may be forged, for example from boron steel which is then direct (thru) hardened. Spindle caps may be located on the spindle ends 52. Manufacturing the main member 51 and spindle ends 52 using different materials and different manufacturing processes may allow the optimum construction in terms of balancing component strength in the areas subjected to the highest stresses against manufacturing costs. However the spindle cross member 34 may be manufactured as a single component.

Figure 5A:
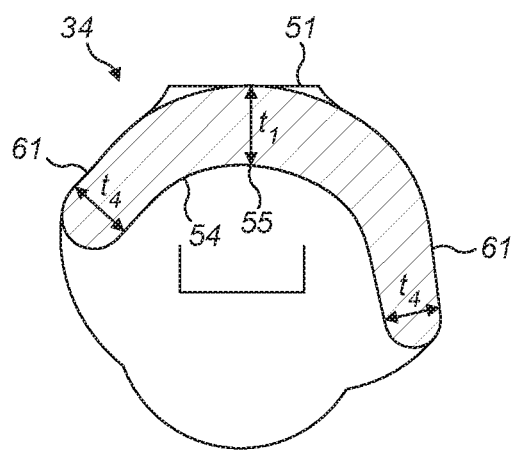
FIG. 5a is a cross sectional end elevation of the spindle cross member of FIG. 5 on the line Va-Va.
Figure 6:
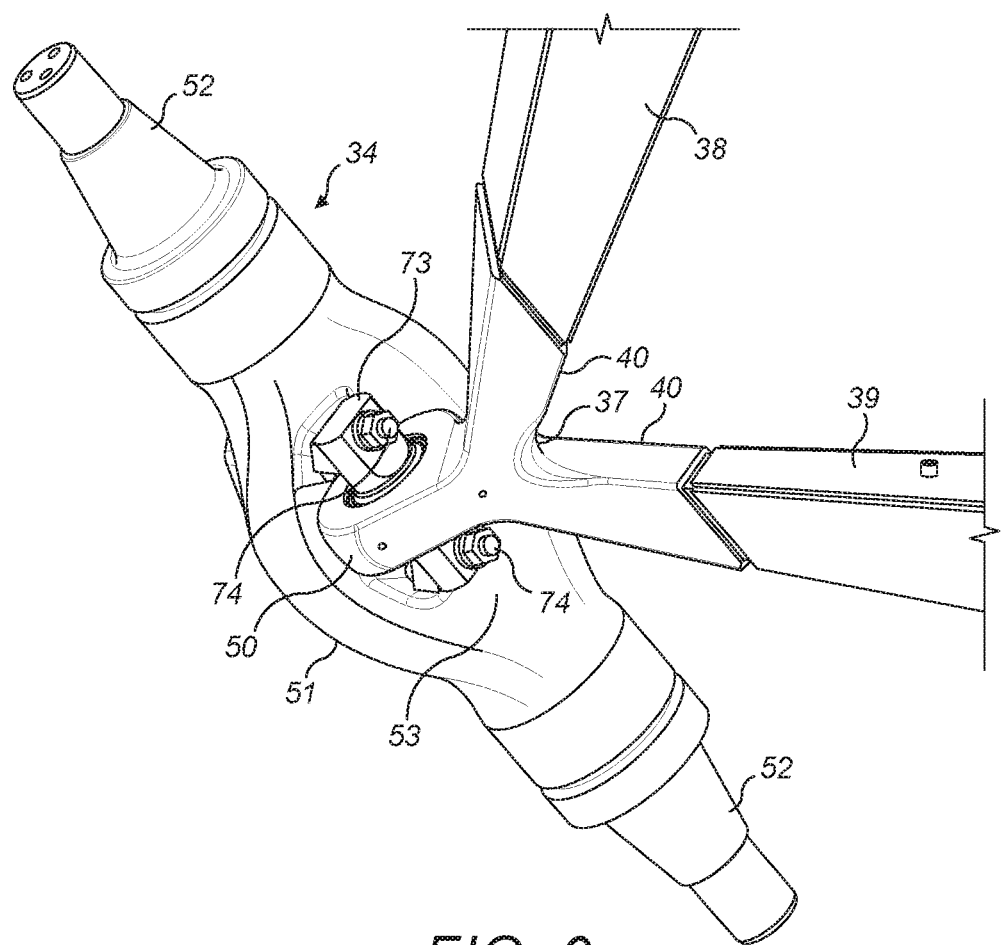
FIG. 6 is a perspective view of a section of the underside of the spindle cross member of FIG. 4.
Figure 7:
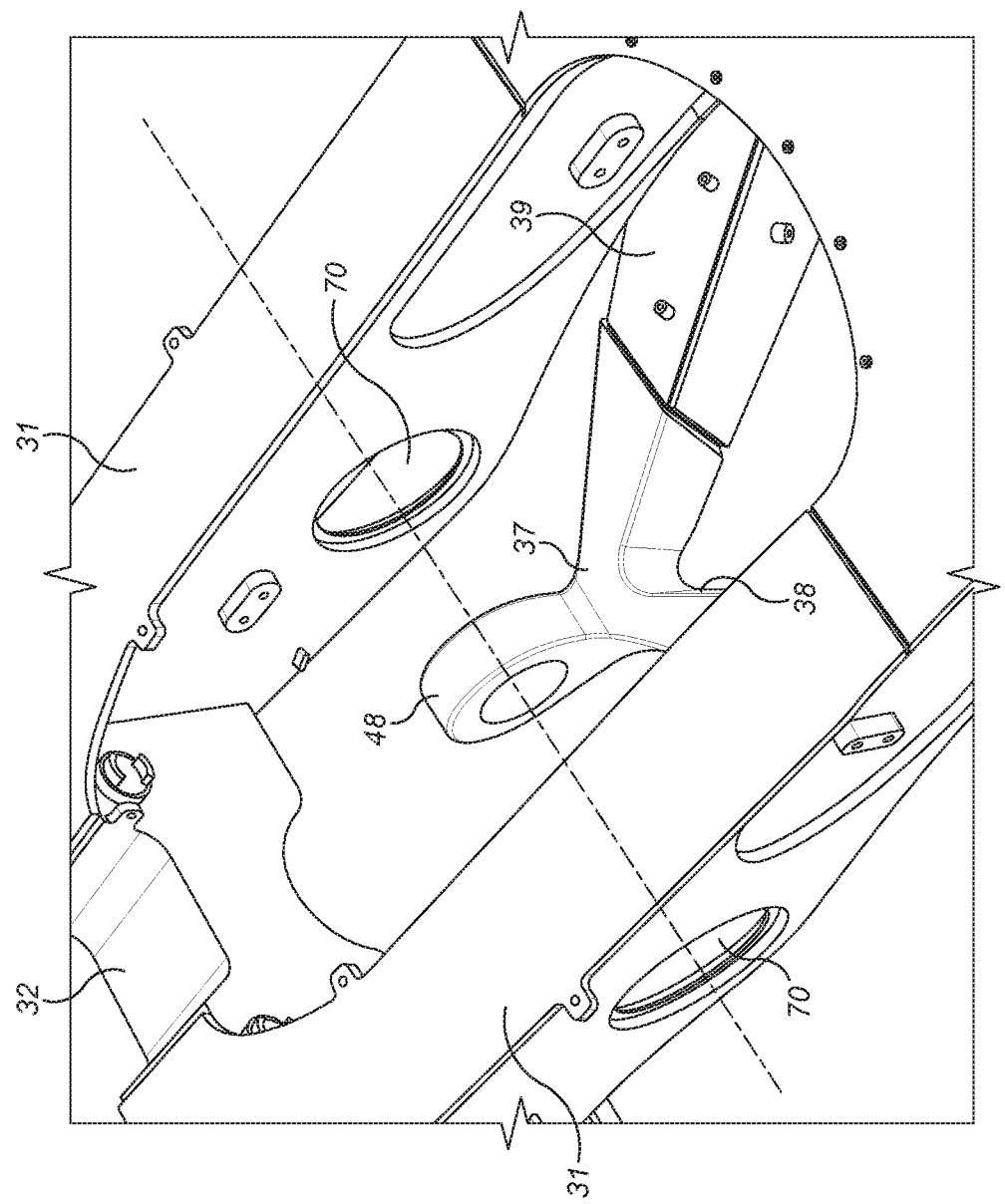
FIG. 7 is a perspective view of a section of the chassis of FIG. 2 with the spindle cross member omitted to show the suspension frame head of the rear suspension member.

A middle section of the main member 51 may have a middle section wall 61 which is at least partially curved and which defines a central cavity 53 and has an opening 62. The central cavity 53 may generally have a cup-like form. This may, for example, be C-shaped, U-shaped, hemispherical, or in the form of dome or an elongate parabolic dome. The thickness of the middle section wall 61 may taper from a central point towards the edges (which define the opening 62) in a transverse direction of the spindle cross member 34. As shown in FIG. 5a, the thickness $t_1$ at the central point of the middle section wall 61 is more than the thickness $t_4$ at the edges of the middle section wall 61. Two bosses 56 may extend from the middle section wall 61 at a roof 54 of the dome into the central cavity 53 and the bosses 56 may be located one on either side of the dome vertex 55 and spaced apart in a longitudinal direction. The bosses 56 may define bores 58 which extend through the wall of the main member 51.

On either side of the middle section of the main member 51 and located along a longitudinal axis of the spindle cross member 34 are tubular end sections 60. The tubular end sections 60 may be formed by extensions of the middle section wall 61, which may extend outwardly along the longitudinal axis of the spindle cross member 34. The tubular ends sections 60 may be separated from the central cavity 53 by a section of the middle section wall. The tubular end sections 60 may define hollow end cavities 59 which may be at least partially cylindrical and may be located so that the tubular end sections 60 open outwardly in a longitudinal direction. The thickness $t_2$, $t_3$ of the walls of the tubular end sections 60 may be less than the thickness $t_1$ of the middle section wall 61 (see FIG. 5). Additionally the thickness of the walls of the tubular end sections 60 may taper as they extend away from the middle section of the main member 51. As shown in FIG. 5 the thickness $t_3$ is less than the thickness $t_2$.

The spindle ends 52 may comprise a first cylindrical end section 65, a middle conical section 66 and a second cylindrical end section 68, which has a larger diameter than the first cylindrical end section 65. A flange 67 may extend from the second cylindrical end section 68, which flange 67 may be sized to be inserted partially into an end cavity 59 of the tubular end sections 60 and secured therein, for example by welding. The longitudinal axis 57 of the spindle cross member 34 may extend through the centre of the spindle ends 52.

The spindle cross member 34 may be affixed to the chassis frame 17 with the spindle ends 52 extending through apertures 70 in the longitudinal chassis members 31. The spindle cross member 34 is secured in position, for example by welding the second cylindrical end section 68 of the spindle ends 52 to the respective longitudinal chassis member 31 on the outside of chassis frame 17 and by welding the main member 51 to the respective longitudinal chassis member 31 on the inside of chassis frame 17.

The first equalizer beam 45 and second equalizer beam 46 may be connected, one at each end, to the spindle cross member 34. The first equalizer beam 45 and second equalizer beam 46 may have apertures 71, located in which are bushings 48. The first cylindrical end sections 65 of the spindle ends 52 may extend through the bushings 48 and may be secured therein by means of a fixing 72 attached to the ends of the first cylindrical end sections 65. The bushings 48 may be conical in shape and may be made of an elastomeric material, such as rubber and may allow the first equalizer beam 45 and second equalizer beam 46 to rotate relative to the spindle cross member 34 and the chassis frame 17.

The rear suspension frame 36 may be pivotally attached to the spindle cross member 34 by means of a straddle bearing 73, which may be a spherical plain bearing, the inner ring of which may comprise a pin. The straddle bearing 73 may be pressed into a lug 50 formed in the suspension frame head 37 of the rear suspension frame 36. The straddle bearing 73 may be attached to the bosses 56 inside the central cavity 53 of the spindle cross member 34 by means of fixings 74, such as bolts. The fixings 74 may extend through the bores 58 in the bosses 56. The length of the bosses 56 and the depth of the central cavity 53 may be selected such that, when the rear suspension frame 36 is attached to the spindle cross member 34, the axis of the straddle bearing 73, and therefore the lug 50, is coaxial with the longitudinal axis 57 of the spindle cross member 34. In addition, the spindle cross member 34 envelops the lug 50.

INDUSTRIAL APPLICATION

The spindle cross member 34 may be the primary structural cross member of the chassis frame 17 which may be subjected to significant forces, which it needs to be able to withstand so as to reduce stress in the chassis frame 17. The main loading experienced by the spindle cross member 34 may be from the axle loads transmitted to the spindle ends 52 via the first equalizer beam 45 and second equalizer beam 46. These forces may induce a bending moment across the spindle cross member 34 and torsion into the longitudinal chassis members 31 of the chassis frame 17. The spindle cross member 34 may also experience loading from the rear axle 21 via the rear suspension frame 36. The geometry of the main member 51 may not only provide a stiff load bearing structure which resists the induced bending moment to minimise damage during use, but may also minimise the risk of defects during casting. The "envelope" provided by the cup-like middle section wall 61 defining the central cavity 53 surrounds the suspension frame head 37 and may resist the bending moment across the spindle cross member 34, induced by the axle loads on the spindle ends 52. This may be achieved by maximising the section/stiffness within the geometric constraints imposed by the rear suspension frame 36; the stiffness provided by the tubular end sections 60 is maintained despite the constraints of the rear suspension frame 36, through the blending of the geometry into the curved middle section wall 61. The effect of the section change from the tubular end sections 60 to the middle section wall 61 in the midsection of the main member 51, combined with the local longitudinal and transverse wall tapering, $t_2$ to $t_3$ and $t_1$ to $t_4$, may result in a general increase in wall thickness towards the centre of the main member 51. This may help to avoid shrinkage defects during the casting process as it may allow directional solidification towards the centre of the main member 51 where a riser is formed in the casting. The riser may be machined away as a part of the finishing process and the resulting flat machined surface may be used to receive the heads of the fixings 74 which may secure the straddle bearing 73 to the bosses 56 inside the central cavity 53 of the spindle cross member 34.

The configuration of the spindle cross member 34 may also be such as to enable the axis of the straddle bearing 73, and therefore the pivot axis of the rear suspension frame 36, to be coaxial with the longitudinal axis 57 of the spindle cross member 34. This may be advantageous in that this enables the rear axle 21 to pivot through the same arc as the first equalizer beam 45 and second equalizer beam 46 rather than following a divergent arc, which may reduce the shearing force on the suspension mounts 47. This may assist in extending the life of the suspension mounts 47.

What is claimed is:

1. A spindle cross member for a chassis system for a vehicle comprising:
    a main member, having a middle section and tubular end sections, said middle section having an at least partially curved middle section wall which defines a cavity with an opening for receiving a head of a suspension frame of the chassis system, and said tubular end sections being located at each end of the middle section located along a longitudinal axis of the spindle cross member; and
    means for pivotally attaching the head of the suspension frame to the middle section wall within the cavity;

wherein the spindle cross member is attached between longitudinal chassis members.

2. A spindle cross member as claimed in claim 1, wherein the middle section wall extends outwardly along the longitudinal, axis of the spindle cross member to form the tubular end sections.

3. A spindle cross member as claimed in claim 1 wherein a thickness of the middle section wall tapers from a central point along the longitudinal axis of the spindle cross member towards edges of the middle section wall in a plane perpendicular to the longitudinal axis of the spindle cross member.

4. A spindle cross member as claimed in claim 1 wherein the tubular end section have walls and a thickness of the tubular end section walls tapers as they extend away from the middle section.

5. A spindle cross member as claimed in claim 1 in which the tubular end sections are at least partly cylindrical.

6. A spindle cross member as claimed in claim 1 further comprising a conical spindle end affixed to an end of each tubular end section.

7. A spindle cross member as claimed in claim 6 wherein the spindle ends comprise a first cylindrical end section, a middle conical section and a second cylindrical end section, the second cylindrical end section having a larger diameter than the first cylindrical end section, wherein a flange extends from the second cylindrical end section, which the flange is inserted partially into an end of the tubular end section.

8. A spindle cross member as claimed in claim 1 wherein the means for pivotally attaching the head of a suspension frame to the middle section wall within the cavity is a straddle bearing.

9. A chassis system comprising a chassis frame and the suspension frame, said chassis frame comprising at least two longitudinal members and a plurality of cross members, at least one of said cross members being the spindle cross member as claimed in claim 1 and said suspension frame having the suspension frame head, wherein the suspension frame head is attached to the spindle cross member and is at least partially enveloped by the middle section wall.

10. A chassis system as claimed in claim 9 wherein the suspension frame head is substantially co-axial with the longitudinal, axis of the spindle cross member.

11. A chassis system as claimed in claim 9 wherein the suspension frame is an A-frame.

12. A vehicle comprising a tractor and a trailer connected to the tractor by an articulated joint, said trailer having at least one axle, wherein the at least one axle is attached to the chassis system of claim 9.

* * * * *